Oct. 3, 1967 K. P. RYAN 3,345,042
CATTLE FEEDING DEVICE
Filed Feb. 18, 1966 7 Sheets-Sheet 3

Oct. 3, 1967     K. P. RYAN     3,345,042
CATTLE FEEDING DEVICE
Filed Feb. 18, 1966     7 Sheets-Sheet 7
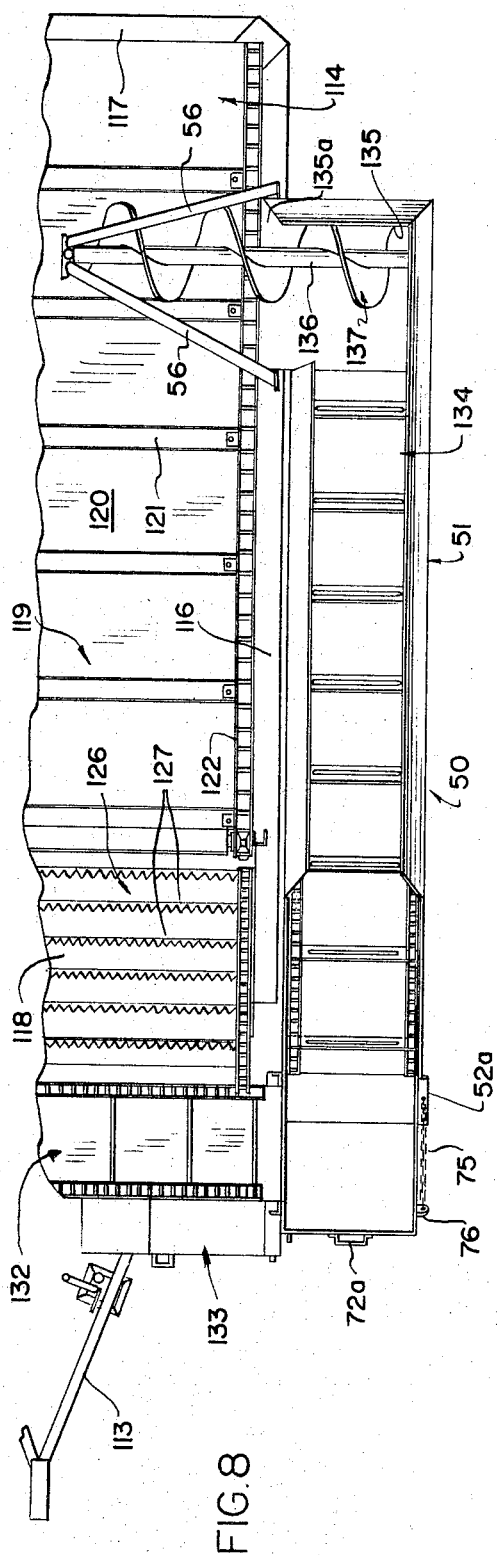
FIG. 8
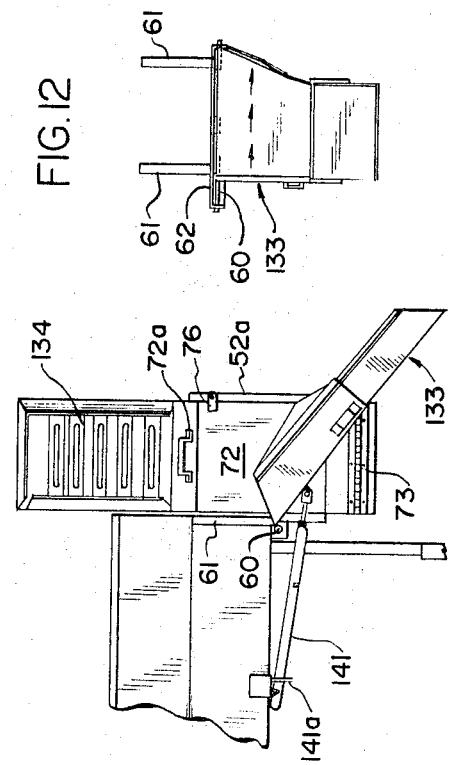
FIG. 12
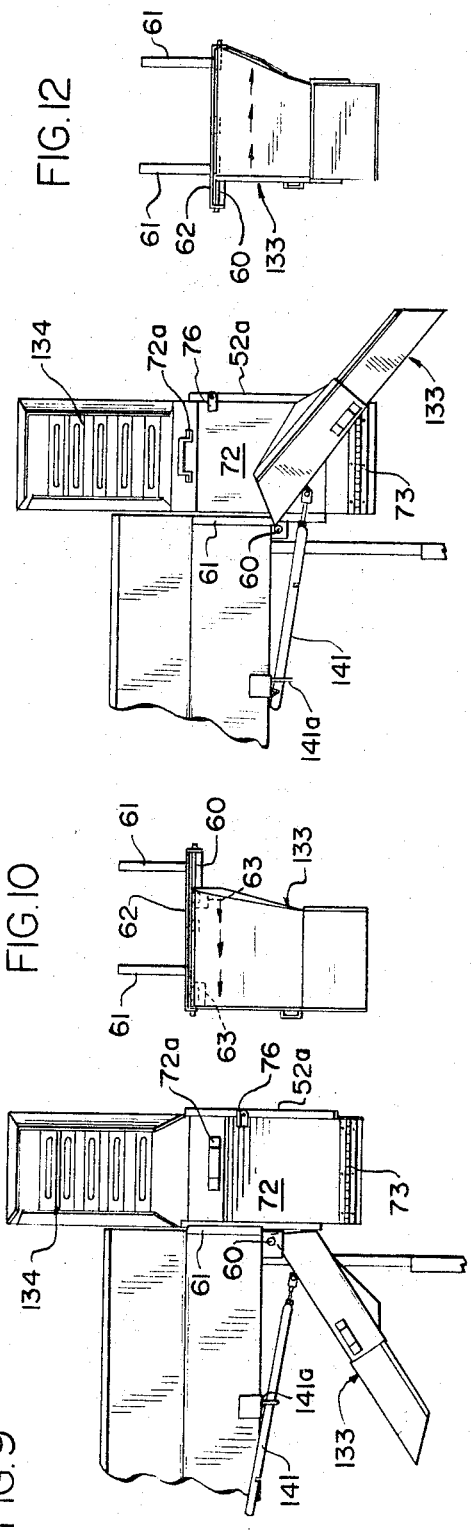
FIG. 11
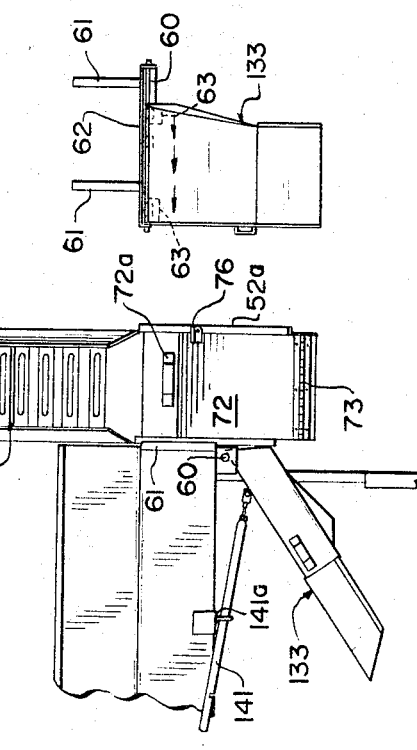
FIG. 10
FIG. 9

United States Patent Office 3,345,042
Patented Oct. 3, 1967

3,345,042
CATTLE FEEDING DEVICE
Kelly P. Ryan, Blair, Nebr., assignor to Blair Manufacturing Co., Inc., a corporation of Nebraska
Filed Feb. 18, 1966, Ser. No. 541,870
11 Claims. (Cl. 259—7)

ABSTRACT OF THE DISCLOSURE

A transporting and mixing wagon for thoroughly mixing a laminated feed mixture or the like, including a first conveyor extending from rear to front of the wagon along the floor thereof, a second elevating and mixing conveyor extending upwardly along an inclined front wall of the wagon, a third conveyor extending transversely across the wagon at the front end thereof and receiving mixed feed from the second conveyor, said third conveyor communicating with a feed discharge means, a fourth conveyor extending from front to rear of the wagon, and a fifth conveyor at the end of the fourth conveyor for transferring material into the rear end of the wagon. The recycling of feed by the fourth and fifth conveyors is alternatively selectable, and the recycling unit defined by the fourth and fifth conveyors may be a separate unit attachable to the wagon.

---

This application is a continuation-in-part of application Ser. No. 438,924 of Kelly P. Ryan filed Mar. 11, 1965, now abandoned, and entitled, Cattle Feeding Device.

This invention relates to a cattle feeding device and more particularly to a device for mixing and dispensing a laminated load of cattle feed.

It is the general object of this invention to produce a new and improved cattle feeding device.

It is a more specific object of the invention to produce a cattle feeding device capable of thoroughly mixing a laminated load of feed and dispensing the mixed feed into bins or troughs to which the cattle have access.

It is a further object of the invention to produce a cattle feeding apparatus of the type disclosed in the preceding paragraphs wherein there is provided a container or box adapted to contain the laminated load of feed and provided with means for advancing the load toward one end of the box where there is positioned a conveyor having a plurality of substantially vertically movable flights, with the apparatus being so arranged that the flights move or slice upwardly through the advancing load and then transfer the portion of the load into a dispensing device, with such operation of the apparatus serving to produce a thorough homogenous mixture of the feed.

It is another object of the present invention to provide in a cattle feeding device of the type described above, means for recirculating the feed through the blending and mixing apparatus when the device is stationary or while the device is being moved about so that a thorough and complete mixing of the feed is accomplished before the same is discharged into said troughs for consumption by cattle.

It is still another object of the invention to provide in a cattle feeding device of the type set forth in the preceding paragraph, recirculating means which are a separate unit attachable to the feed container; so that the basic feed wagon can be sold without the recirculating means, if desired, yet the wagon can be readily converted to a feeding device having recirculating means when such a feature is wanted.

It is a further object of the invention to produce a cattle feeding device of the type described above which is in the form of a wagon adapted to be connected to a prime mover for moving the wagon to various portions of a cattle feed yard and with the prime mover serving as a source of power to operate the various conveyors described.

Other and further objects of the invention will be readily apparent from the following description and drawings in which:

FIG. 8 is a fragmentary plan view of the structure shown in FIG. 7;

FIG. 9 is a fragmentary, front elevational view of the structure shown in FIG. 8 during a remix cycle;

FIG. 10 is a fragmentary view of the discharge chute of the embodiment of FIG. 6 during a remix cycle;

FIG. 11 is a fragmentary, front elevational view, similar to FIG. 9, and illustrating the structure during a discharge cycle; and FIG. 12 is a fragmentary view, similar to FIG. 10, and illustrating the position of the discharge chute during a discharge cycle.

Figure 1:
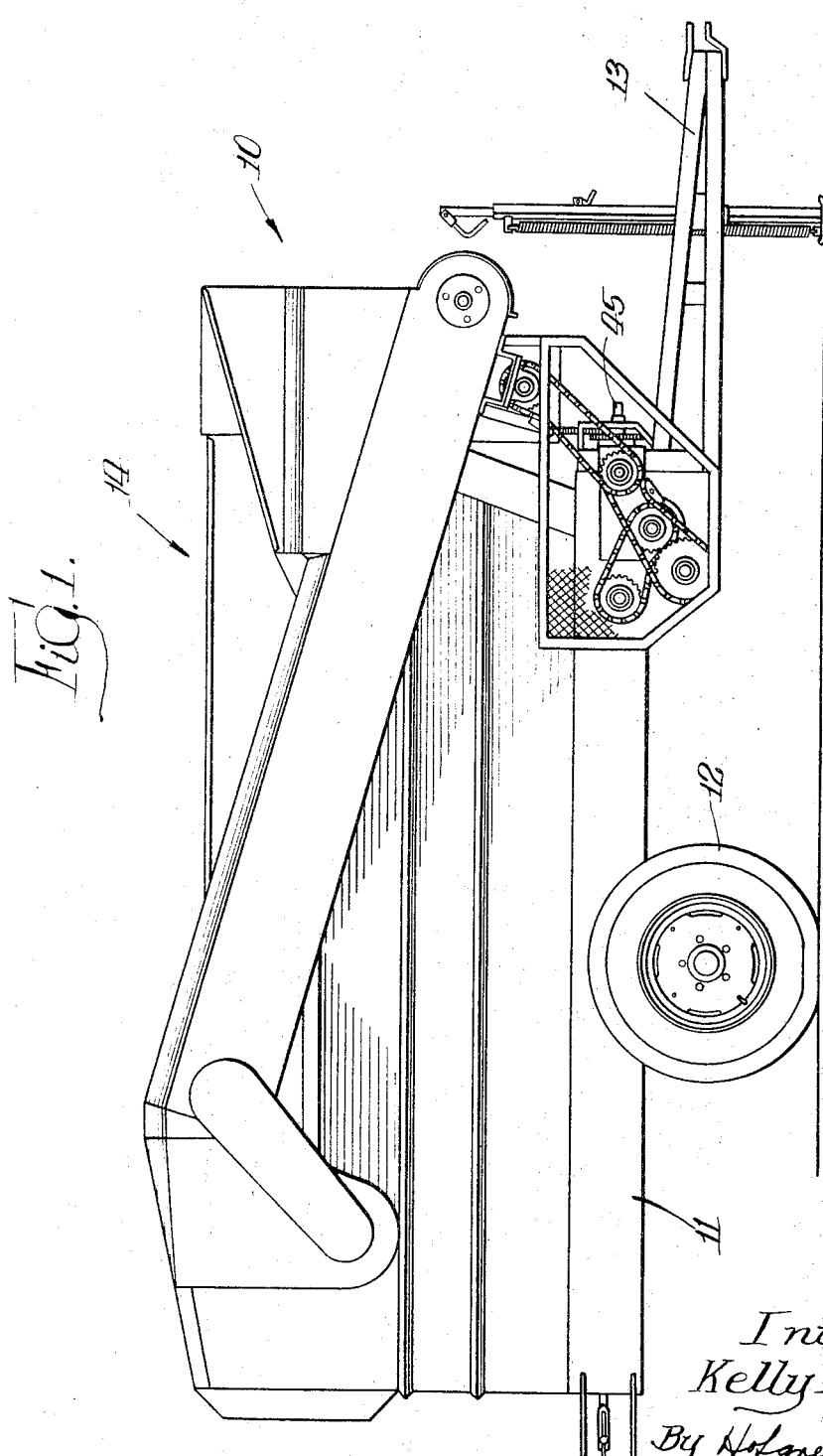
FIG. 1 is a side elevational view of a feed wagon embodying the invention.
Figure 2:
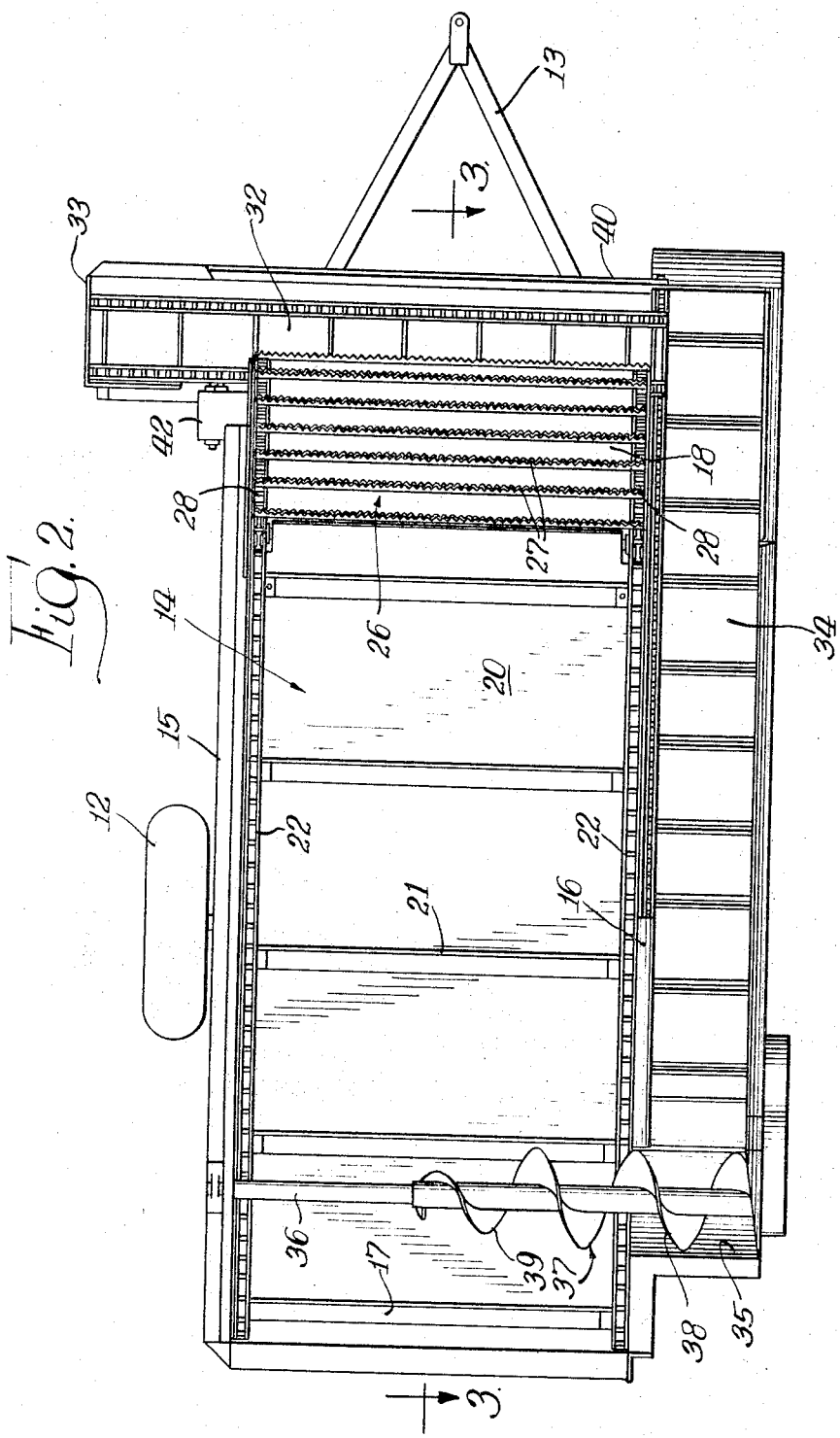
FIG. 2 is a top plan view of the apparatus shown in FIG. 1.

While this invention is susceptible of embodiment in many different forms, there is shown in the drawings and will herein be described in detail one specific embodiment and a modification thereof, with the understanding that the present disclosure is to be considered as an exemplification of the principles of the invention and is not intended to limit the invention to the embodiments illustrated. The scope of the invention will be pointed out in the appended claims.

High grade beef, rather than being shipped directly from the ranch to the slaughter house, are often sent to an intermediate feed yard where they are fed a carefully selected diet for the purpose of improving their quality and thus enhancing their value. The diet at the cattle feed yard may vary with the condition of the beef and of the weather, but will usually consist of a mixture of corn, dried alfalfa, alfalfa and molasses mixture, vitamins, and often antibiotic powder. The feed yard stores these various feed ingredients separately, but a thorough and complete intermixture of ingredients is necessary to provide the cattle with a properly balanced diet. A great deal of cattle illness and deaths which occur in the feed yard may be attributed to the lack of thorough mixing of the foregoing feed ingredients so that the cattle were given too much of one ingredient and not enough of another.

It has been a common feed yard practice to pile all of the feed ingredients into a feed wagon in layers. Thus there may be a lower layer of dried alfalfa, a covering layer of corn, a dusting of antibiotics and a sprinkling of vitamin pellets over the corn, and a final covering of molasses-treated alfalfa. Heretofore such loads were mixed by hand as they were being emptied into feed bins or were mixed by beaters positioned at one end of the feed wagon and comprising rotating beating wheels similar to those used on manure spreaders for intermixing the feed. That such prior methods for mixing the feed were not wholly successful is attested to by the continuing deaths of cattle due to an unbalanced diet in the feed yard.

The feeding apparatus of the present invention is capable of producing a homogenous and thoroughly intermixed cattle feed from a laminated load of such feed and for this purpose is provided with a vertical conveyor positioned at one end of the load-carrying box and movable so as to move its flights upwardly through the load and then to a position dumping the portion of the load so gathered by the flights into a second conveyor which is operable alternatively to deliver the mixed feed to a discharging device for discharging the same into a feed trough or for recirculating the mixed feed back into the container at the end opposite to that occupied by the upwardly moving mixing flights. Thus, feed once mixed by the flights is remixed further to disperse all portions of the feed uniformly throughout the mix, thus insuring the delivery into the feed trough of a well mixed feed containing the proper ratios of all ingredients of which it is comprised.

Referring now to the drawings, there is shown a vehicle 10 having a frame 11 supported for ground traversing movement on wheels 12 and provided with a tractor hitch 13 at its forward end for attachment to a tractor in order to draw the vehicle to various positions as desired. Mounted on the frame is a container 14 having side walls 15 and 16 and end walls 17 and 18 defining an open-topped generally box-like structure. A first conveyor 19 travels over the bottom 20 of the container and comprises a series of spaced flights 21 attached at their ends to chains 22 travelling about pairs of sprockets 23 and 24. The sprockets are driven through a series of gears and chains from the power takeoff of the tractor so that a load of feed placed in the container is constantly moved thereby toward the front wall 18 thereof.

Figure 3:
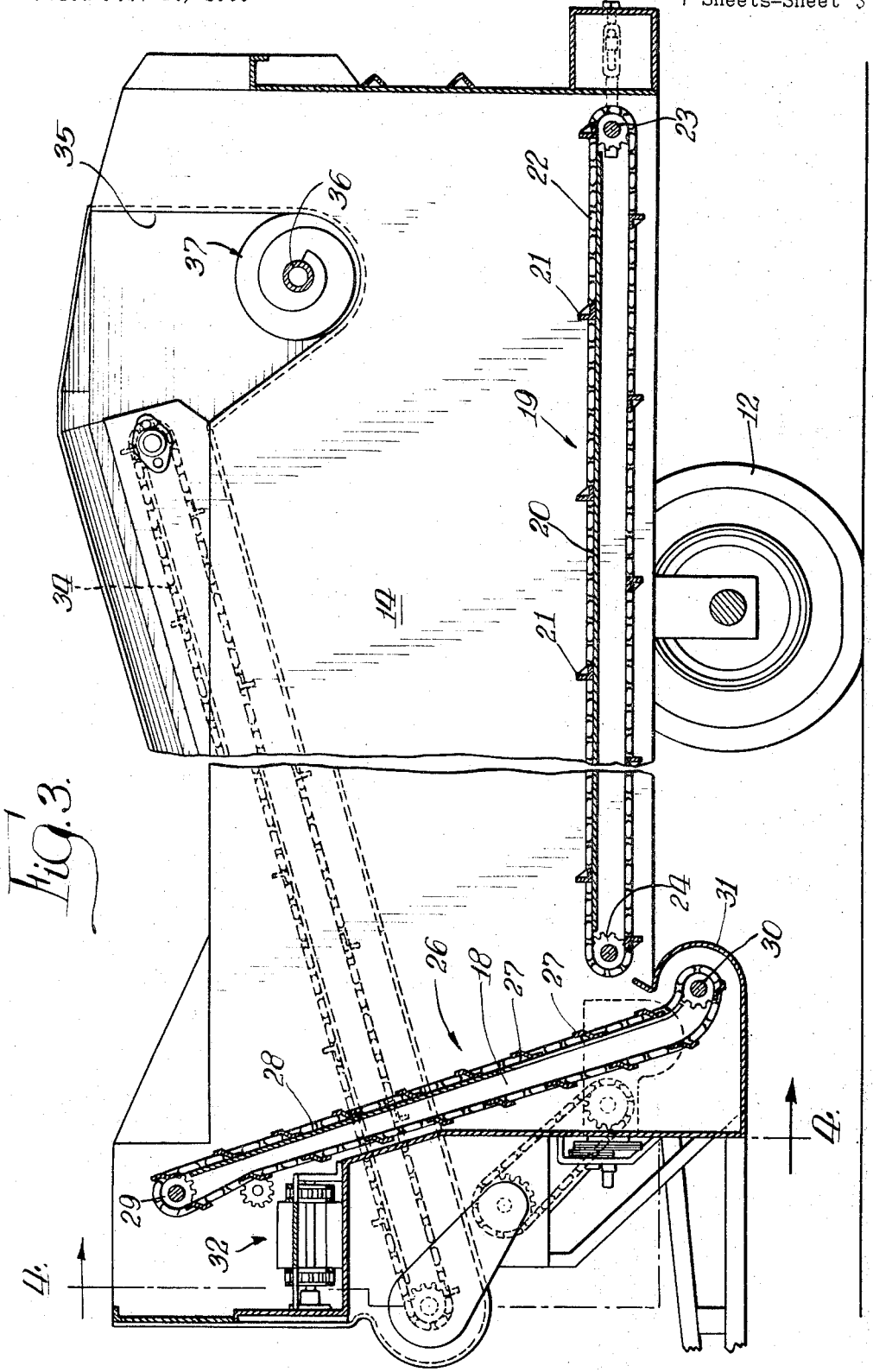
FIG. 3 is a vertical section taken along line 3—3 of FIG. 2.
Figure 4:
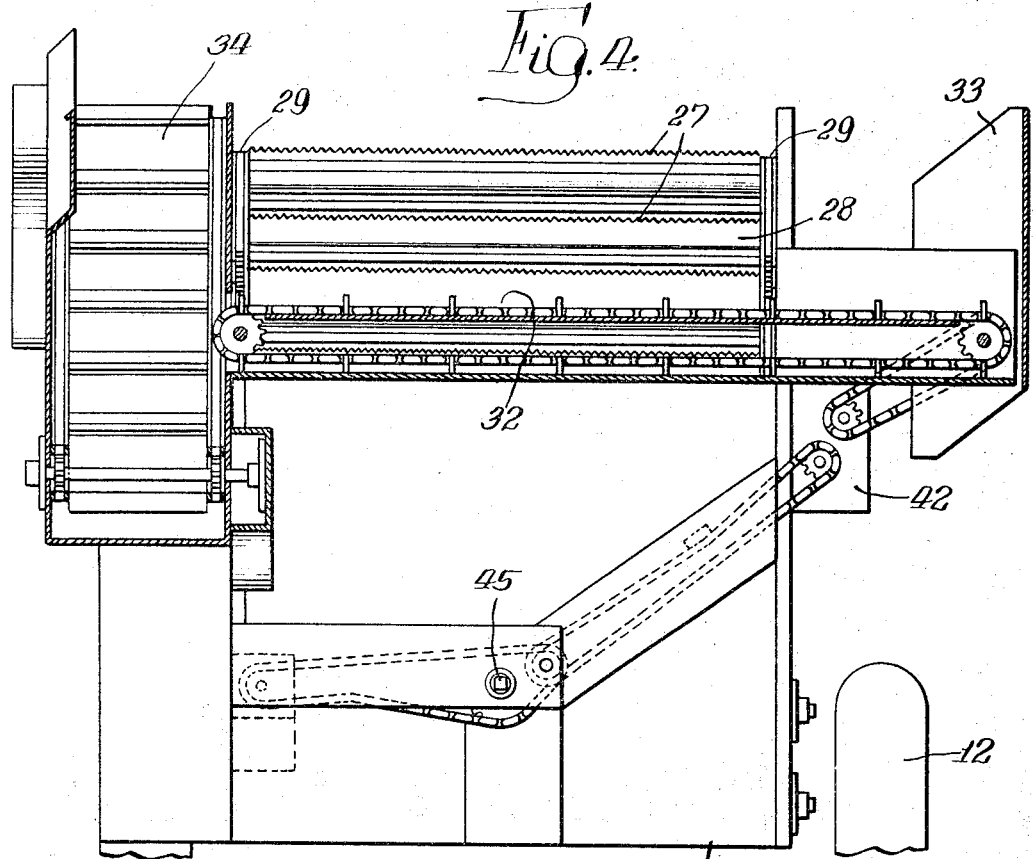
FIG. 4 is a vertical transverse section taken along line 4—4 of FIG. 3.

As best shown in FIG. 3, travelling up the front wall 18 is an elevating and mixing means 26 comprising a plurality of spaced flights 27 mounted on chains 28 carried by sprockets 29 and 30 which, when driven, slice upwardly through the feed, advanced toward the inclined front wall 18 by the first conveyor 19. As the flights 27 pass over the upper pair of sprockets 29 the material elevated thereby is dropped onto a second conveyor 32 of usual construction, which is operable to deliver feed dumped thereon either toward the right-hand or the left-hand side of the vehicle as may be selected by the operator. A bottom wall or boot 31 is positioned under the elevating and mixing means 26 so as to prevent feed from dropping out of the bottom of the container as it is fed toward the means 26 by the first conveyor 19. The action of the flights and the circulation of the feed serve to mix the materials therein thoroughly and thus to blend the feed into a uniform mixture.

Figure 5:
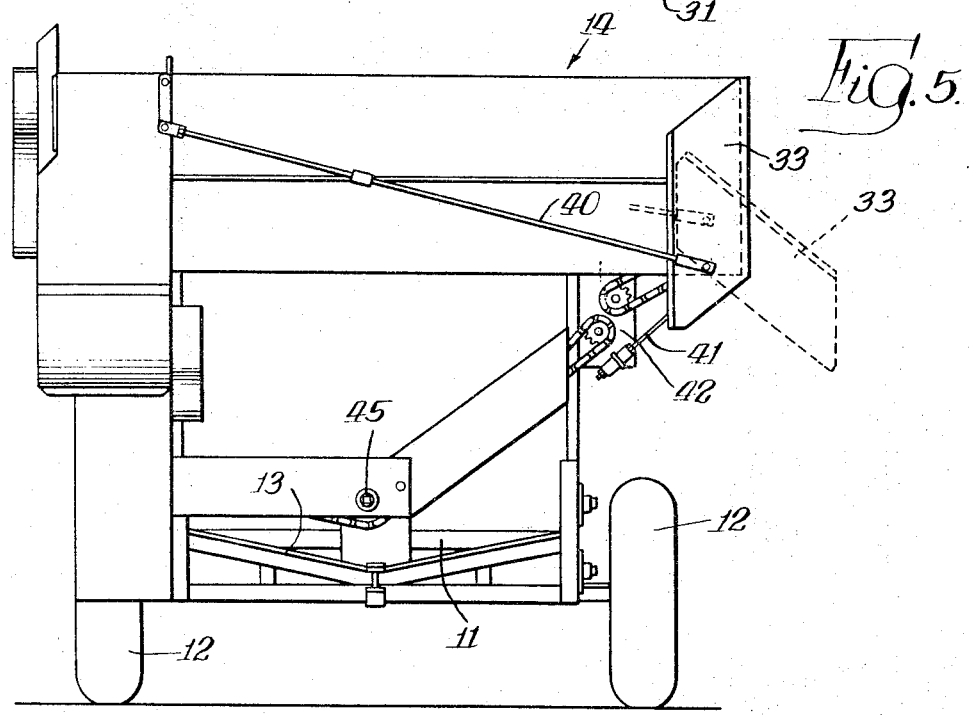
FIG. 5 is a front elevational view of the device shown in FIG. 1.

When the feed is thoroughly mixed and ready for discharge, the conveyor 32 may be operated to deliver the mixed feed to the discharge means in the form of a chute 33 as seen in FIG. 5. Alternatively, the second conveyor 32 may be operated to move feed in the opposite direction into a third conveyor 34 which operates to move feed delivered thereto upwardly toward the rear of the vehicle and into a hopper 35. Rotatably mounted on a shaft 36 extending transversely of the container is an auger 37 having a first portion 38 located within the hopper 35 and a second portion 39 located in and near the top of the rear end of the container 14. The auger of course serves to further mix and to move the feed transversely out of the hopper 35 and into the rear portion of the container 14. In this process, the auger serves as an important part in the mixing by constantly working the feed in the auger area as the auger is relocating the feed in container 14. From this point it is moved again by the first conveyor 19 toward the mixing means 26 for additional mixing and further blending.

As indicated in FIG. 5, the discharge chute 33 may be moved to the discharge (dotted) position shown. Movement of the discharge chute to the dotted discharge position activates, by means of a lever 41, reversing gears in a gear box 42 to reverse the direction of movement of the second conveyor 32. Connecting rod 40 serves to open and close a gate in the end of the conveyor 32 as chute 33 is raised or lowered. The gate is located at the end of conveyor 32 at the intersection of conveyor 34. Rod 40 is attached to and activated by the movement of chute 33.

Means are, of course, provided for rotating shaft 36, and for driving conveyors 19, 32 and 34, as well as the elevating and mixing means 26, all from the power take-off of the tractor which can be connected to a shaft 45 (FIG. 1) for this purpose. The drive means are for the most part shown in the drawings, and will not be further described in detail herein as they may be of conventional form and will within the skill of the ordinary designer.

In operating the apparatus of the present invention the wagon is moved by means of a tractor to a loading position where alfalfa, corn, antibiotics, vitamins, and other feed materials are dumped therein in predetermined proportions. Normally this is accomplished by dumping the ingredients into the container in sequence, i.e., the alfalfa, followed by the corn, followed by the antibiotics, vitamins, etc. As the vehicle is drawn from the loading station to the feed lot, the feed is initially in a laminated condition and if discharged in this condition would dispense an unevenly blended feed heavy in one ingredient here and in another there. By use of the present invention, however, the operator can, during the loading operation, initiate operation of all the conveyors to move the load toward the elevating and mixing means 26 to initiate blending and at the same time operate the second conveyor 32 so as to deliver the mixed feed to the conveyor 34, hopper 35, and auger 37, for re-introduction into the opposite end of the container. In this way, the mixing is almost completed as soon as the load is loaded. Each load may in addition be mixed several times during the travel between the loading station and the feed troughs in the feed lot, and thorough and complete blending of the feed is thereby assured. Upon arrival at the feed troughs, the operator swings the discharge chute 33 to the down position, this in turn reverses the direction of conveyor 32, closes the gate at the other end of conveyor 32 and the feed is discharged into the feed trough.

Figure 6:
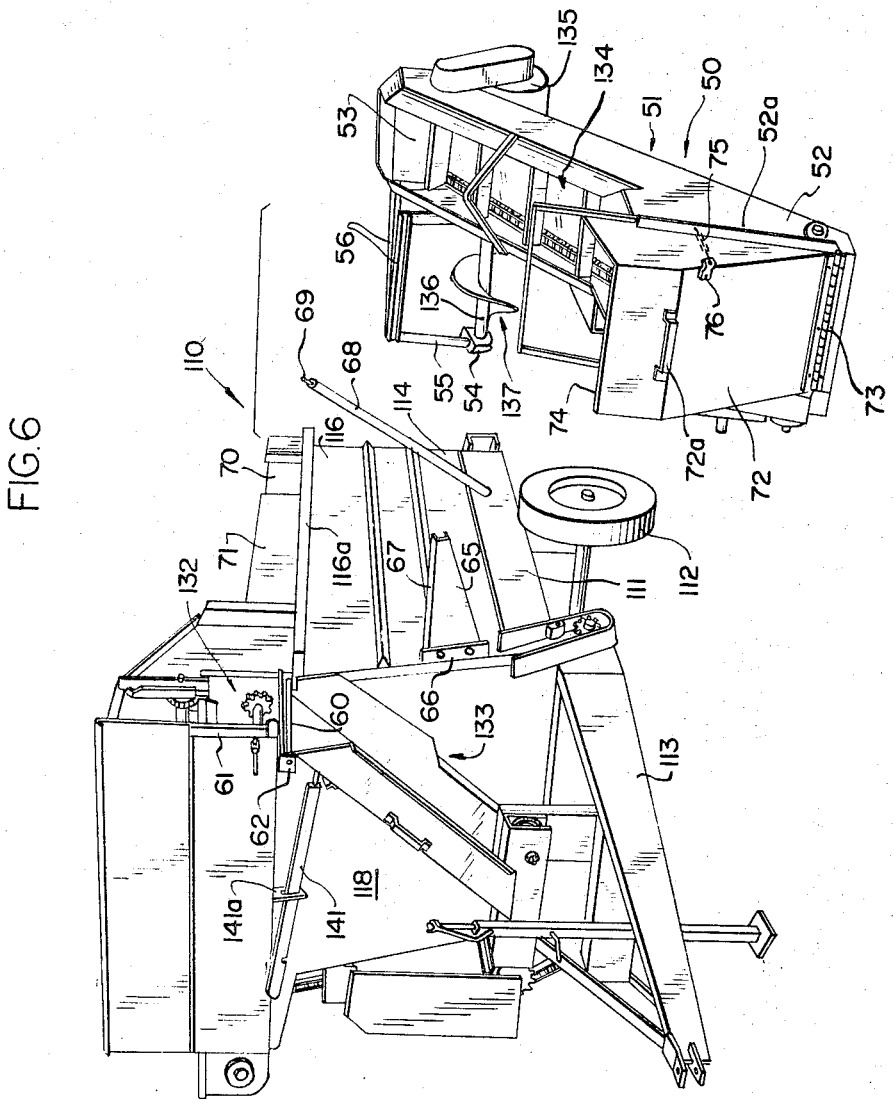
FIG. 6 is a front, exploded perspective view of a modification of the feed wagon, wherein the recirculating unit is a separate assembly attachable to the feed container.

Referring now to the embodiment of FIGS. 6–12, the feeder wagon thereof is similar to that illustrated in FIGS. 1–5, and accordingly, similar reference numerals have been used to indicate corresponding elements, and have been increased by the sum 100. In the embodiment of FIGS. 6–12, the feed recycling unit is indicated generally at 50, and said unit is separate from and attachable to the vehicle 110, as is best seen in FIG. 6. Since the recycling unit 50 is a separate assembly, the wagon 110 may be sold as a separate entity without means for recycling the feed, if desired.

As in the embodiment of FIGS. 1–5, wagon 110 includes a first conveyor 119 movable along the floor 120 of the container 114 for advancing feed from rear to front of the container. A second elevating and mixing conveyor 126 slices through the feed and advances the same up the inclined front wall 118 of the container 114, where it is transferred to a cross conveyor 132 at the front of the container 114. Conveyor 132 runs from left to right as viewed in FIG. 6 for discharging feed from the wagon 110 down a discharge chute 133 into a feed bunk or the like.

Discharge chute 133 is pivotally mounted beneath the unit end of conveyor 132; and for this purpose, a bracket 62 is secured to the enclosed housing of conveyor 132 by support arms 61. A forwardly extending, horizontally disposed shaft 60 is carried by bracket 62; and sleeves 63 on chute 133 rotatably and slidably mount the chute 133 on the shaft 60. This enables the chute 133 to be moved longitudinally along the rod 60 between a remix position shown in FIG. 10, and a discharge position shown in FIG. 12, as will be hereinafter explained. A lever 141 is provided for moving the chute 133 between the positions of FIG. 9 and FIG. 11, and a suitable retention member 141a is provided for holding the lever 141 in the desired position.

Means are provided on the vehicle 110 for attaching the recirculating unit 50 thereon, when desired. The attached means includes a support arm 65 extending laterally outwardly from the container 114 adjacent the front end thereof, and bolted to a mounting plate 66 securely welded to the side 116 of the container 114. Support arm 65 is generally U-shaped in cross section, as can be best seen in FIGS. 6 and 7, and provides a flat upper surface 67 upon which the lower portion of unit 50 is seated. Suitable fasteners, not shown, may extend through the upper flange of support arm 65 into the lower portion of the unit 50. A brace leg 68 is secured to the frame 111 of the vehicle 110 adjacent the rear end thereof, and leg 68 extends upwardly and outwardly at an angle with respect to the side 116 of container 114, as is best seen in FIG. 6. An adjusting stud 69 is provided at the upper end of leg 68, and is engageable with the undersurface of the auger boot 135 for leveling of the unit 50, if necessary.

From the foregoing it will be apparent that the wagon 110 without the recirculating unit 50 provides a suitable device for mixing and dispensing animal feed into a feed bunk or the like. The unit is relatively inexpensive, and thus provides a machine which only marginally successful farmers can easily afford. Since the vehicle is provided with means for attaching a recirculating unit thereon, it may be readily converted to a feeder wagon having recirculation of the feed, when desired.

Unit 50 includes a rearwardly and upwardly extending housing 51 for conveyor 134; and housing 51 includes an entrance portion 52 at the forward end thereof, and an exit portion 53 at the rearward end thereof. The exit end 53 of housing 51 communicates with the auger boot 135, and auger 137 transfers the feed laterally inwardly from the boot 135 into the rear end of the container 114. The inner end of auger shaft 136 is mounted in a bearing support 54 carried by a vertical post 55 which is secured to the housing 51 by brace arms 56. When the recirculating unit 50 is mounted on the vehicle 110, a portion 135a of auger boot 135 seats on the upper portion 116a of container side wall 116, and the auger 137 extends inwardly into the container 114 through an opening 70 in the side rail 71.

Figure 7:
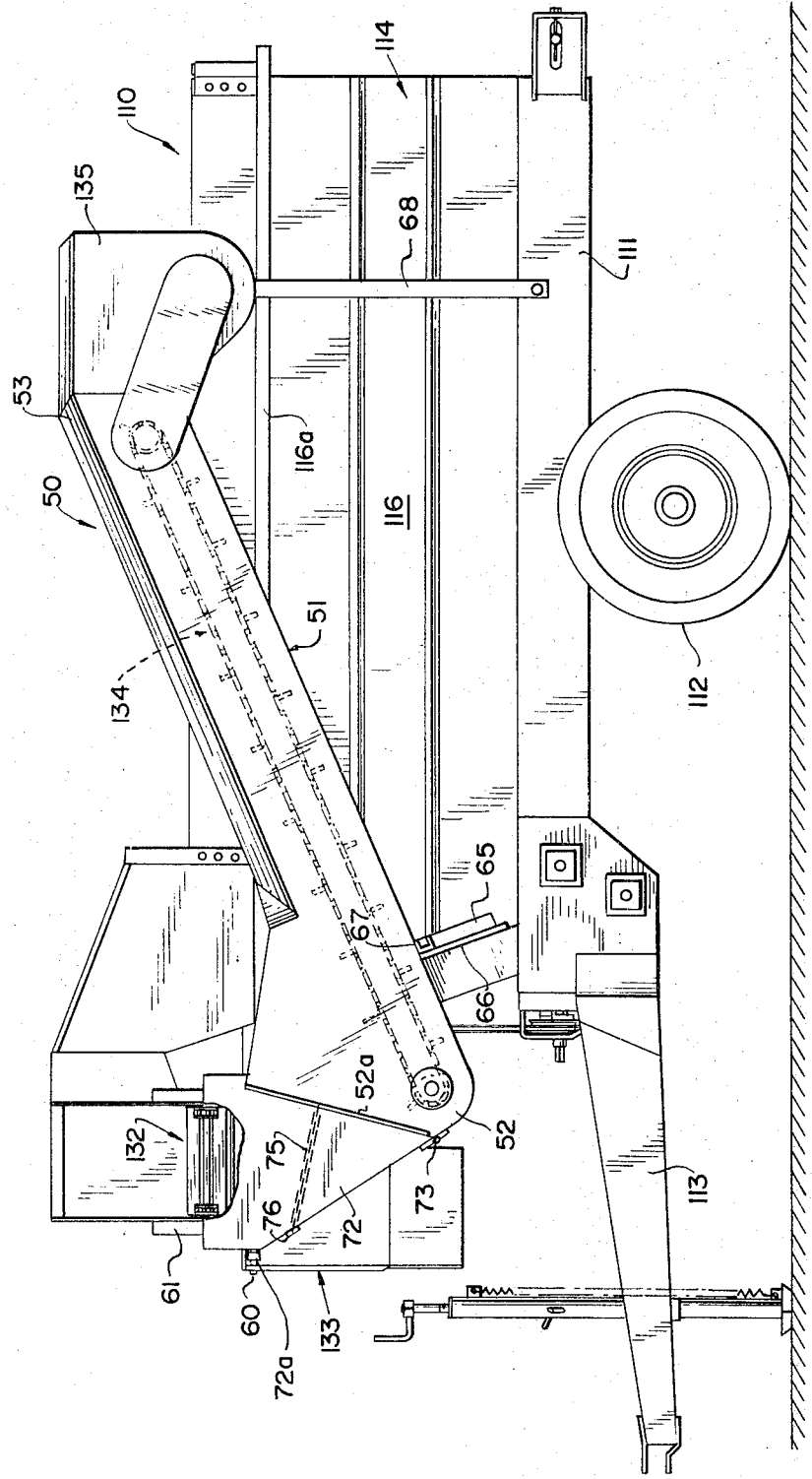
FIG. 7 is an enlarged, side elevational view of the feed wagon embodiment of FIG. 6, with the recirculating unit being secured to the feed container.

A hopper 72 is pivotally mounted about a horizontal axis 73 in the entrance end 52 of housing 51; and hopper 72 includes a partially open side wall 74, which is positionable in alignment with the exit end of cross conveyor 132 when the hopper 72 is in the position shown in FIG. 7. A chain 75 is connected between a flange 52a on the entrance portion 52 of housing 51 and a chain support 76 on the hopper 72 to properly position the housing 72 as shown in FIG. 7. With hopper 72 in the position of FIG. 7, feed passes laterally outwardly from the conveyor 132 into the hopper 72, from whence it is conveyed upwardly by conveyor 134 along housing 51 into the auger boot 135, from whence it is conveyed laterally outwardly by the auger 137 into the container 114. As with the embodiment of FIGS. 1–5, this recirculation serves to thoroughly mix the components of the animal feed mixture. During the recirculation cycle, the discharge chute 133 is positioned at the outermost portion of shaft 60 (FIG. 10) and is held in a retracted position under the conveyor 132, as shown in FIGS. 6 and 9.

When it is desired to discharge feed from the vehicle 110, the hopper 72 is pivoted rearwardly about axis 73 to expose the exit end of conveyor 132. A handle 72a may be provided on the hopper 72 to ease the manipulation thereof. The chute 133 is then moved rearwardly on shaft 60 to position the same directly under the exit end of conveyor 132, and chute 133 is moved to the position of FIG. 11 by lever 141 to direct the thoroughly mixed feed into the feed bunk. In the discharge position of FIG. 11, the front wall of the hopper 72 serves as an effective closure to prevent recirculation of the animal feed. Since the discharge chute 133 and recirculation unit 50 are provided on the same side of the vehicle 110, it is not necessary to reverse the direction of conveyor 132 when changing between recirculation and discharge cycles, as was necessary in the embodiment of FIGS. 1–5.

I claim:

1. A vehicle for mixing and discharging animal feeds comprising a frame mounted for ground traversing movement, a container for the feed carried by the frame, means for discharging feed from the vehicle, means for moving feed in the container toward one end thereof, elevating and mixing means at said end of the container for mixing feed and elevating the same, a first conveyor extending transversely across said one end of the vehicle below the discharge end of said mixing and elevating means for receiving mixed feed therefrom, said first conveyor communicating with said discharge means, and alternatively selective means for recirculating mixed feed from said first conveyor to the other end of the container or to deliver the mixed feed to said discharge means.

2. A vehicle as defined in claim 1 wherein an auger is provided at the other end of the container for delivering feed thereto, and means connect said auger and said first conveyor.

3. A vehicle as defined in claim 1 wherein said alternatively selective means includes a second conveyor communicating with said first conveyor and extending to the other end of said container.

4. A vehicle as defined in claim 3 wherein said second conveyor and said discharge means are provided at the same side of said container.

5. A vehicle for mixing and discharging animal feeds comprising a frame mounted for ground traversing movement, a container for the feed carried by the frame, means for discharging feed from the vehicle, a first conveyor movable across the bottom of the container to move feed therein toward one end of the container, an inclined wall forming said end of the container, a plurality of spaced flights movable upwardly along said wall through the feed to mix and elevate the same, a second conveyor adjacent said wall and positioned to receive feed elevated by said flights, a third conveyor, said second conveyor communicating at one end with the discharge means and at its other end with the third conveyor, an auger at the other end of said container and positioned to receive feed from the third conveyor and deliver the same to said other end of the container, and means for selectively operating the second conveyor to deliver feed to said third conveyor or to said discharge means.

6. For use with a feeder wagon having means for discharging animal feeds therefrom and means for mixing said feeds and circulating the same toward said discharge means, a recirculating unit comprising: conveyor means having an entrance end and an exit end; means for securing said conveyor means to said wagon and for positioning said conveyor entrance end adjacent said discharge means and said conveyor exit end at a point remote from said discharge means; and means at said conveyor exit end for transferring feed into said wagon, whereby said animal feeds are recirculated and remixed by said circulating and mixing means.

7. A recirculating unit as defined in claim 6 wherein closure means are movably mounted on said conveyor means adjacent the entrance end thereof for preventing recirculation of feed when desired.

8. A recirculating unit as defined in claim 7 wherein said closure means includes a chute pivotally mounted on the end of said conveyor means and movable between a first position for placing said conveyor means in communication with said discharge means and a second position for preventing the flow of feed from said discharge means into said conveyor means.

9. A vehicle for mixing and discharging animal feeds comprising a frame mounted for ground traversing movement, a container for the feed carried by the frame, means at one side of the container for discharging feed from the vehicle, a first conveyor movable across the bottom of the container to move feed therein toward one end of the container, an inclined wall forming said end of the container, a second conveyor movable upwardly along said wall through the feed to mix and elevate the same, a third conveyor adjacent the upper end of said wall and positioned to receive feed elevated by said second conveyor, a fourth conveyor at said one side of the container and extending away from said container end, said third conveyor extending transversely across said container and communicating with the discharge means and with the fourth conveyor, an auger at the other end of said container and positioned to receive feed from the fourth conveyor and deliver the same to said other end of the container, and means for selectively delivering feed to said fourth conveyor or to said discharge means.

10. A vehicle as defined in claim 9 wherein said fourth conveyor and auger form a unit attachable to said container.

11. A vehicle as defined in claim 1 in which an inclined wall forms said one end of said container, and wherein said elevating and mixing means is movable upwardly along said wall.

References Cited
UNITED STATES PATENTS

| | | | |
|---|---|---|---|
| 2,438,301 | 3/1948 | Schulte | 259—45 |
| 2,609,115 | 9/1952 | Oklejas | 214—521 |
| 2,676,002 | 4/1954 | Wolfe | 259—41 |
| 2,756,887 | 7/1956 | Raney et al. | 214—519 |
| 2,767,963 | 10/1956 | Ringen | 259—97 |
| 2,877,914 | 3/1959 | Herr | 214—522 |
| 2,786,655 | 3/1957 | Cowsert | 259—41 |
| 2,960,320 | 11/1960 | Heider | 259—97 |
| 2,998,152 | 8/1961 | Wognum et al. | 214—522 |

WALTER A. SCHEEL, *Primary Examiner.*

R. W. JENKINS, *Assistant Examiner.*